Oct. 31, 1939.                G. F. DENNLER                2,177,871
                            AGRICULTURAL IMPLEMENT
                            Filed July 5, 1938            2 Sheets—Sheet 1
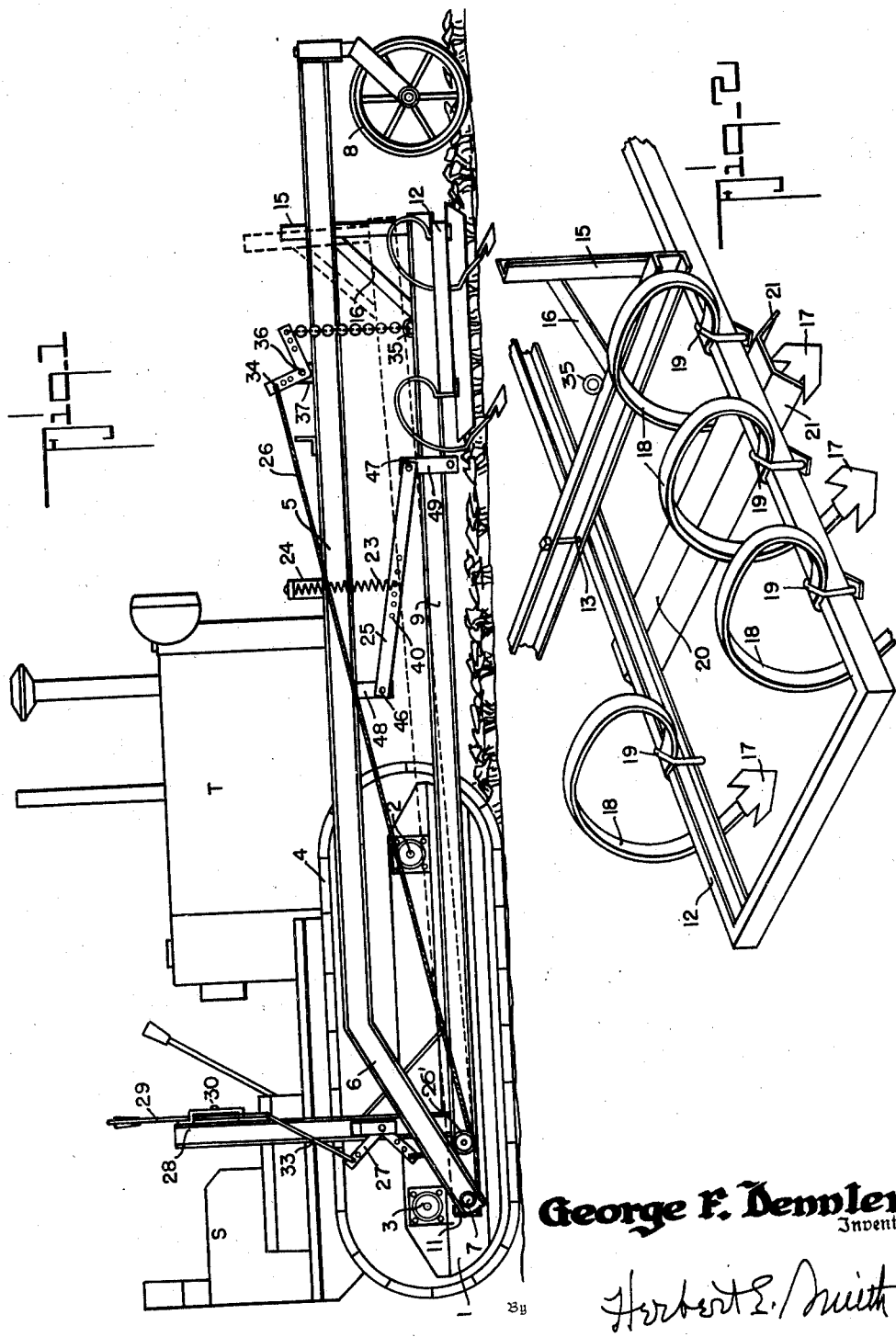
George F. Dennler
                Inventor
By Herbert E. Smith
                Attorney

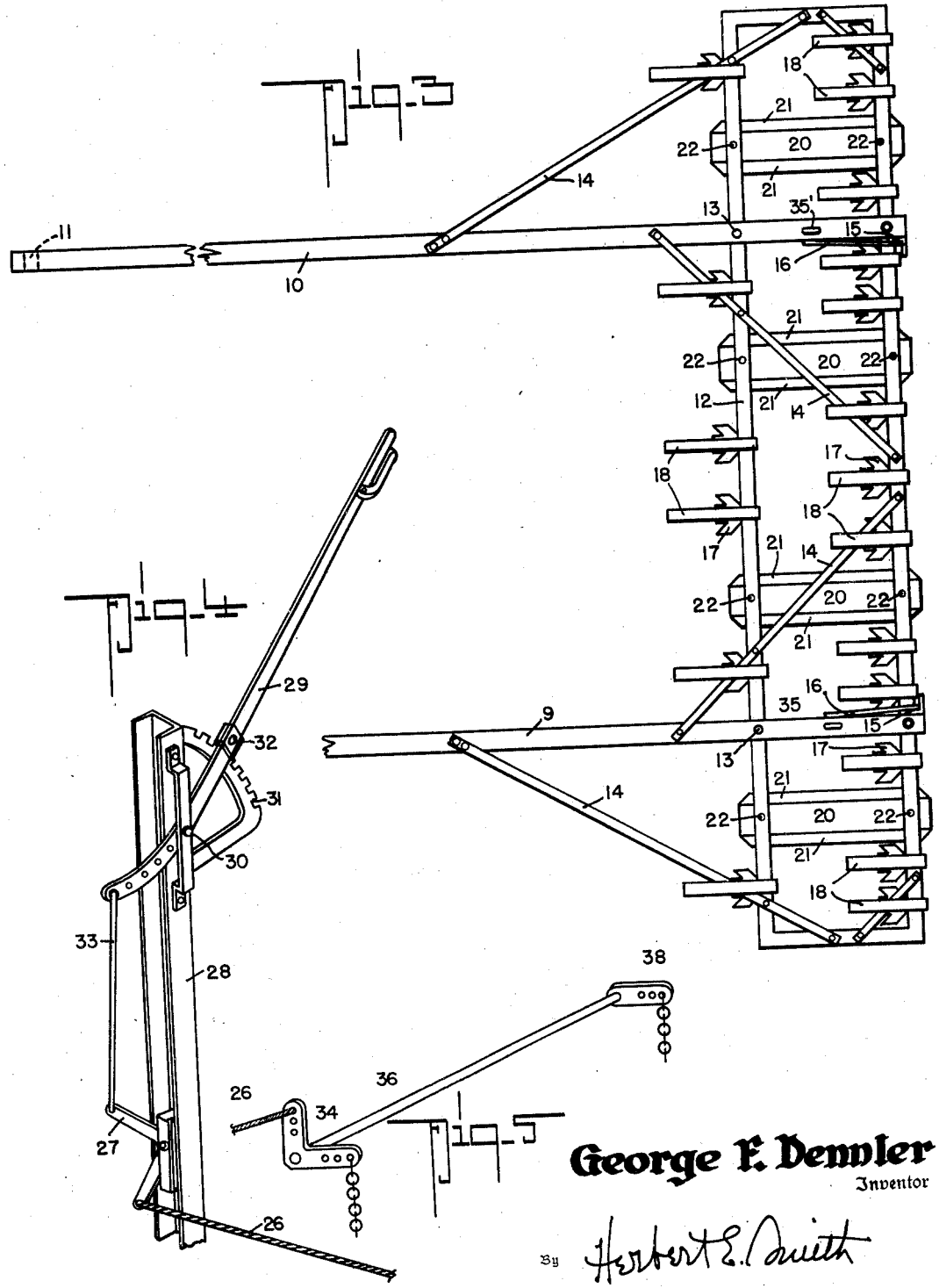

Patented Oct. 31, 1939

2,177,871

UNITED STATES PATENT OFFICE 2,177,871

AGRICULTURAL IMPLEMENT

George F. Dennler, Juliaetta, Idaho, assignor of one-half to Charles M. Kerby, Moscow, Idaho Application July 5, 1938, Serial No. 217,436

6 Claims. (Cl. 97—47)

My present invention relates to improvements in agricultural implements of the tractor-propelled type, wherein the tractor is located at the rear of the implement, and the working part, such as a harrow, cultivator, or similar farming tool is located in front of the tractor and in front of the operator of the tractor.

The cultivator in which my invention is herein disclosed is especially designed for cultivating growing crops that have been planted in rows, and means are provided whereby the working parts of the implement and the tractor may be steered or guided in the spaces between the rows without damage to the crop. By the novel combination and arrangement of the tractor and the cultivator the latter may readily be attached or hitched to the former; the implement as a whole may, with facility, be steered and turned as required; and the cultivator or working parts may be elevated out of working position when not required, as for instance, when transporting the implement from one field to another field. Means are also provided for protecting and guarding the spaced rows of the crop from the cultivator teeth and from loose materials disturbed by the teeth, and these guards also form guides, which are under observation of the operator, by means of which he maintains the implement alined with the rows.

The invention consists essentially in certain novel combinations of parts by means of which the above purposes are accomplished. In the accompanying drawings I have illustrated one complete example of the physical embodiment of my invention wherein the parts are combined and arranged according to one mode I have thus far devised for the practical application of the principles of my invention, but it will be understood that changes and alterations may be made in these exemplifying structures, within the scope of my claims, without departing from the principles of my invention.

Figure 1 is a view in side elevation of the tractor-propelled implement of my invention, showing the cultivator in working position, and by dotted lines also showing the cultivator elevated out of working position.

Figure 2 is an enlarged, fragmentary, perspective view showing a portion of the cultivator frame, shovels, one of the crop-guards, and one of the brace-posts.

Figure 3 is a top plan view of the cultivator frame per se with its shovels and guards.

Figure 4 is a perspective view of the lever mechanism for elevating and lowering the cultivator.

Figure 5 is a view in perspective of the equalizing lift mechanism.

In order that the general arrangement and relation of parts may readily be understood I have shown in Figure 1 a conventional farm-tractor T having the usual seat S occupied by the driver or operator. The tractor is equipped with the usual side frames 1, front axle 2, rear axle 3, and the flexible traction belt 4 that forms the endless track for the tractor.

In carrying out my invention I employ a generally U-shaped main frame comprising two side bars 5, having their rear ends bent or turned down at 6, and the frame is pivoted on pins 7 mounted on the side bars of the tractor. These pivot pins project laterally from the side bars of the tractor, and they are located below and in the vertical plane with the rear axles of the tractor. The side bars 5 of the U-shaped main frame project from the rear alongside the tractor, and to the front of the tractor, and the extreme front of the main frame is supported by a pair of ground wheels or casters 8, 8 spaced at opposite sides of the longitudinal axis of the implement. The tractor is thus partially enclosed within the main frame, which frame at its rear end is pivoted to the tractor, and the front of the main frame is wheel-supported, so that the tractor exerts a pushing effect on the frame, and the latter is adapted to rise and fall as the wheels pass over irregularities in the field. The tractor belts, and the caster wheels of course travel along the furrows between the rows of plants.

While my invention is adapted for use with various farm tools, for convenience of illustration and description I shall hereinafter refer to the tool as a cultivator, which is resiliently supported from the main frame, and at the rear the cultivator is pivotally supported on the pivot pins 7 heretofore referred to.

As best seen in Figure 3 the cultivator frame is of a general T-shape, comprising two longitudinally extending side rails 9 and 10, one located at each side of the tractor, and the rear ends 11 of these side rails are pivoted on the pins 7 of the tractor side-bars. At the front of the side rails, and ahead of the tractor, is rigidly mounted a rectangular cross frame 12 bolted to the side rails at 13, and this cross frame projects laterally at both sides beyond the side rails 9 and 10 and beyond the sides of the tractor. To reinforce the cultivator frame, braces 14 or diagonal bars 14 are bolted to the side rails and the cross frame, and the cultivator frame, as seen in Figure 1 is located beneath the main frame of the implement.

The cultivator frame is vertically movable on its pivots 7 with relation to the tractor and the main frame, and for bracing and guiding the cultivator frame in its movement, as well as for preventing lateral displacement of the cultivator frame with relation to the main frame, I employ two spaced guide posts 15, 15, mounted rigidly at the front of the cultivator frame. These posts are braced at 16, and they are of sufficient length to project upwardly between the two side bars 5 of the main frame, with which side bars they have a slight frictional contact.

A well known type of cultivator shovel as 17 is mounted by its spring arm or shank 18, and U-bolts 19, at proper places on the cross frame for performing their usual functions, and these shovels are, of course, arranged in predetermined positions with relation to the rows of plants.

For protection of the crop, or rows of plants, and for use in gauging the paths of the various parts of the implement with relation to the rows of plants, I employ a number of shields extending longitudinally of the implement, and spaced laterally to correspond with and travel above and along the rows of plants. Four of these shields are shown as mounted beneath the cross-frame and they each comprise a flat plate 20 having outwardly and downwardly flaring flanges 21, and the plates are bolted as at 22 to the cross frame. While traveling above a row of plants each shield protects the row against loose material, and at the same time the shields are readily visible to the occupant of the seat S who, by observation, guides or steers the implement so that the shields follow the rows of plants.

The cultivator frame, which is pivotally supported at its rear end concentrically with the pivotal support of the main wheel-frame, is also resiliently supported from the main frame and thereby maintained in a generally horizontal position. For this purpose I employ two or more suspension springs 23 anchored at their upper ends on the main frame by brackets 24, and also anchored at their lower ends to beam bars 25. The beam bars 25 at their ends are pivotally connected at 46 and 47 to the fixed bracket 48 and the slide bracket 49 respectively. The bracket or pivot arm 38 is fixed supported from the side bars 5 of the U-shaped frame and the slide bracket 39 operably engages the side rails 9 of the cultivator frame. The springs 23, under tension, are designed to support the cultivator frame with its shovels in working position, and the rear pivotal support of the cultivator frame permits a slight up and down movement of the front of the cultivator frame, due to the resiliency of the springs. The springs 23 may be adjustably secured or anchored by selective engagement in any one of a series of holes 40 in the beam bars 25.

The cultivator frame with its cross-frame and shovels may be tilted or elevated, as indicated by dotted lines in Figure 1, to lift the shovels above the ground, for various purposes, and for this purpose I employ a main control cable 26 extending longitudinally of the implement and connected at its rear end to a bell-crank 27 pivotally supported on an upright post 28 that is rigidly mounted on the main frame. The cable 26 is led around the sheave 26' pivotally supported on the rear of the side rail 9. A control lever 29 located in position for ready access to the operator of the implement is pivoted at 30 on the post, and provided with the usual rack 31 and pawl 32 for holding the lever in adjusted position. The lever is connected by rod 33 to the bell-crank 27, and through this connection power is applied to the main cable 26. The forward end of the main cable 26 is connected to a bell-crank 34 secured to the end of a shaft 36 which is pivotally supported in pivot brackets 37 secured upon side bars 5 of the U-shaped frame. The shaft 36 at its other end has secured thereto the arm 38. Chains 39 and 40 hang downwardly from the bell-crank 34 and the arm 38 respectively, and these chains are secured to the anchoring eye-bolts 35 and 35' on the cultivator frame. The application of power to the main cable 26 equally lifts the chains 39 and 40 to raise the cultivator frame and lift the shovels out of engagement with the ground.

The two eye-bolts 35 and 35' are fixed on the side rails 9 and 10 of the cultivator frame, as seen in Figure 3, near the front of the cross frame.

By placing the cultivator ahead of the tractor, and by the use of the shields or gauges, the operator occupying the seat S is enabled to readily observe the operations of the implement and follow the rows of plants, and the control lever 29 which is readily accessible to the operator may be employed as required in adjusting the cultivator to varying conditions in the field. The shields protect the plants against tearing of leaves, foliage, or blossoms, and they shed loose material that might otherwise drop over the rows of plants.

The control lever may be mounted on the tractor, or on its side bar, and preferably the lever is bent inwardly toward the operator to be in position readily accessible for use. By pivotally supporting the rear end of the main frame on the tractor near the rear axle, and by the use of the caster wheels 8 at the front of the main frame, the steering movements of the implement are simplified, and the implement is capable of being steered in accord with the usual steering operations of the tractor when the latter alone is used.

Having thus fully described my invention, what I claim as new and desire to secure by Letters Patent is:

1. The combination with a tractor and a wheel-frame having pivotal supports on the tractor, of a cultivator frame having concentric pivotal supports on the tractor, means for resiliently suspending the free portion of the cultivator frame from the wheel-frame, and means for elevating the free portion of the cultivator frame.

2. The combination with a tractor having supporting pivots, a main frame supported on said pivots and projecting forward of the tractor, and a supporting wheel for the front free end of the main frame, of a cultivator frame having its rear end supported on said pivots and located beneath the main frame, suspending springs supported on the main frame and connected with the front free portion of the cultivator frame, and means for elevating the cultivator frame on its pivotal supports.

3. The combination with a tractor having supporting pivots, a main frame supported on said pivots, and a supporting wheel for the front free end of the main frame, of a cultivator frame having its rear end supported on said pivots and cultivating tools mounted on said frame, and means for elevating the free end of the cultivator frame.

4. The combination with a tractor having supporting pivots, a main frame supported on the pivots, and a supporting wheel for the front free end of the main frame, of a cultivator frame having its rear end supported on said pivots and located below the main frame, means for elevating the free end of the cultivator frame, and spaced upright guide posts on the cultivator frame for co-action with the main frame.

5. The combination with a tractor and a wheel-frame having a downwardly extending rear end pivotally supported on the tractor, of a cultivator frame having concentric pivotal supports on the tractor and spaced beneath the wheel-frame, a pair of suspension springs anchored at their upper ends to the wheel-frame intermediate its ends, a pair of beam-bars pivotally connecting the wheel-frame and the cultivator frame, said bars having a series of bolt holes, and bolts for attaching the lower ends of the springs to selected holes in the beam-bars, and means for elevating the cultivator frame on its pivotal supports.

6. The combination with a tractor and a wheel-frame having pivotal supports thereon, of a cultivator frame having concentric supports on the tractor, means for resiliently suspending the free portion of the cultivator frame from the wheel-frame, a pair of lifting levers pivoted on the wheel-frame, and lifting chains connecting said levers with the cultivator frame, an elevating cable connected to one of said levers, an operating lever having a pivotal support on the tractor, a guide roller for the cable, and linkage connecting the rear end of the cable with said operating lever.

GEORGE F. DENNLER.